March 15, 1966  A. M. THOMPSON  3,240,966
PORTABLE ELECTROMAGNETIC TOOL ASSEMBLY
Filed July 5, 1963
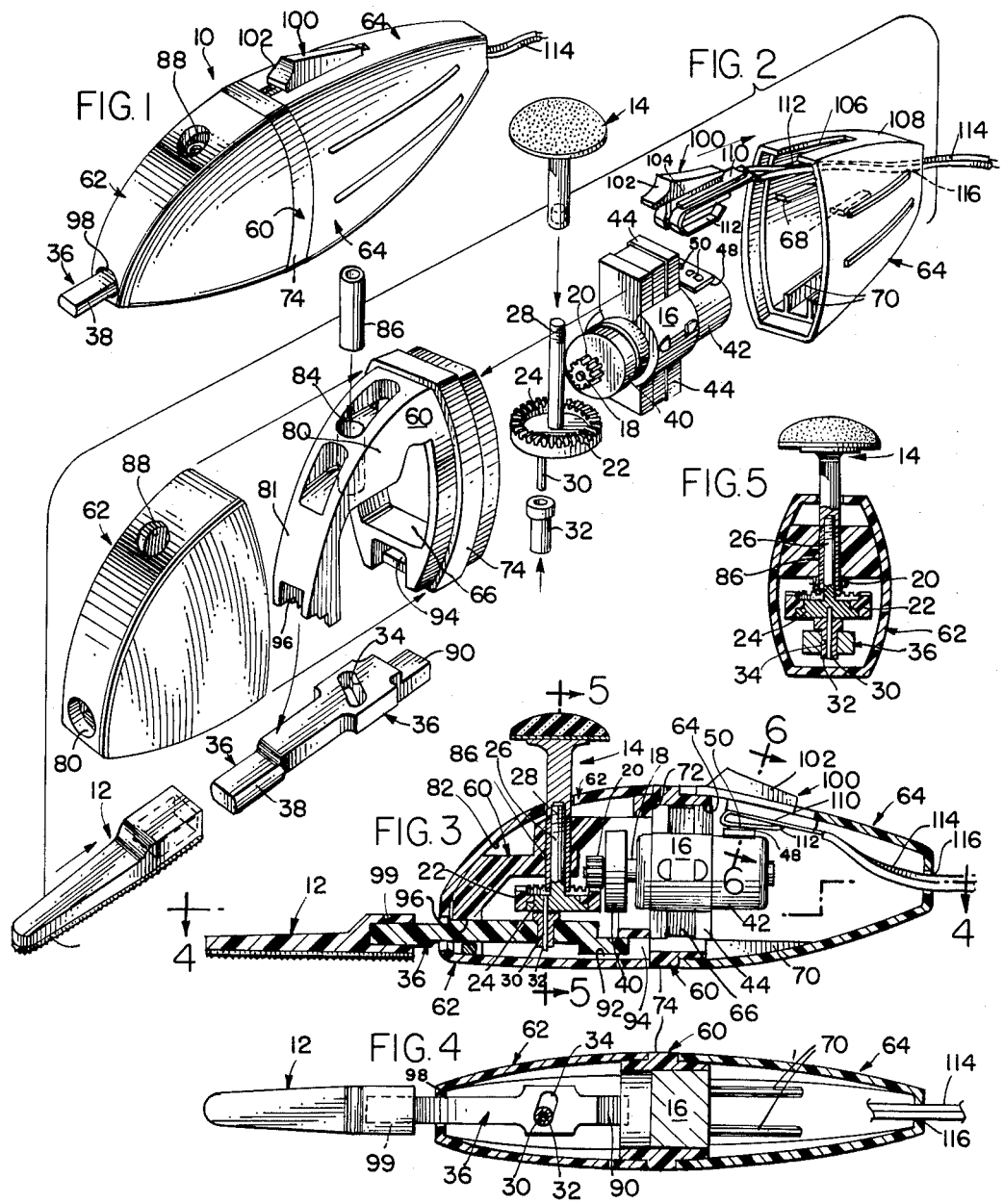
INVENTOR:
ARNOLD M. THOMPSON
BY
ATT'YS

United States Patent Office 3,240,966
Patented Mar. 15, 1966

3,240,966
PORTABLE ELECTROMAGNETIC TOOL
ASSEMBLY
Arnold M. Thompson, Wheaton, Ill., assignor to Thompson Designs, Inc., Addison, Ill., a corporation of Illinois
Filed July 5, 1963, Ser. No. 293,119
9 Claims. (Cl. 310—50)

The present invention relates generally to portable tool assemblies and has particular reference to a small electric motor and housing therefor which, when assembled as a unit, is useful as a hand tool for performing a wide variety of work. The portable tool assembly of the present invention has been designed for use primarily as an electrically powered implement which is capable of association with a utility cabinet of the type that is shown and described in United States Patent No. 2,861,578, granted on November 25, 1958, and entitled "Utility Cabinet." In such patent there is disclosed an electrically powered manicure implement and, in addition, a portable carrying cabinet which serves to store the implement when the latter is not in use and also serves to house an electrical power supply for the implement, together with control means whereby the power supply may, at will, be operatively connected to the implement to operate the same. Whereas, the electrically powered implement or tool assembly that is shown and described in aforementioned United States Patent No. 2,861,578 is essentially of the rotary type in that the single output shaft (armature shaft) thereof is adapted to receive thereon a wide variety of abrading or cutting tools as, for example, sanding, buffing or polishing disks, the portable tool assembly of the present invention has a reciprocating output slide member which is likewise capable of receiving thereon a wide variety of tools as, for example, a nail file, a sanding strip or the like. The present portable tool assembly further includes an auxiliary rotary output member to which rotary abrading or cutting tools may be applied if desired. The tool assembly of the present invention is not limited to use as a manicure implement or appurtenance inasmuch as the two output members thereof are adapted to receive thereon such tools as files, saws or other cutting tools, impact punches for design and stippling work, and the like. Irrespective, however, of the particular use to which the present rotary tool assembly may be put, the essential features thereof are at all times preserved.

At the present time, there are available on the market a wide variety of small inexpensive electric motors of the low voltage direct current type. These motors, most of which are of Japanese origin, have a voltage rating of either 1½ or 3 volts, are designed to be operated by one or two single cell flashlight batteries, are extremely light and compact, and cost but a few cents. Such motors have found wide application as power units for novelty items, such as animated toys, toy vehicles and portable hand tools. Structurally, these motors are extremely simple in design and construction and each consists of a permanent field magnet and a rotary armature which are held in operative relation to each other by light sheet metal stampings, the latter providing the motor casing and also the journal bearings for the armature shaft. The casing-forming stampings are crimped around the field magnet and are interlocked by means of tongue and slot connections, the entire motor assembly being devoid of clamping bolts and threaded connections.

The low cost of such electric motors is directly attributable to the mass production methods of manufacturing them and, as a result thereof, wide manufacturing tolerances obtain not only among motors of similar design and different origin but also among motors of common origin issuing from the same dies and utilizing the same metal stock. Such motors make no provisions for assembly or attachment in the ultimate articles with which they are to be associated and invariably it is the work of the manufacturing consumer to design any particular novelty item around the shape of the motor so that the motor may be securely anchored in operative position within or with respect to the article to be electrically powered. The operation incident to drilling and tapping the field magnet for bolt-anchoring purposes is not only costly, but it weakens the strength of the magnetic field and usually the sheet metal motor casing is incapable of withstanding drilling and tapping operations. Sometimes the motor is glued or cemented in position but this involves a period of drying time which raises the cost of the item and also results in a bond which is frequently broken in shipment or as an incident to rough usage. Spring hold-down anchor clips and the like are sometimes employed for motor-anchoring purposes but these are costly and the anchoring of the clips themselves presents a problem. Where the design of the casings of the toys or other novelty items with which the motors are to be employed is made to conform to the shape of the motors so that when the items are assembled the motors will be fixedly confined within the casings, manufacturing tolerances in the construction of the motors result in a large number of rejects or, alternatively, in the production of defective items wherein the motor casings are left with open seams or other ill-fitting parts.

The present invention depends for its novelty upon a new and different association of casing, motor and power train parts, the association being such that it overcomes the above-noted limitations that are attendant upon the wide manufacturing tolerances which are prevalent in connection with small low voltage electric motors of the character briefly outlined above in connection with their use as novelty items. Toward this end, the invention contemplates the provision of a three-part motor casing and gear box including a central or intermediate body part to which there are fitted front and rear cup-shape closure caps. The central body part makes provision for supporting the electric motor. The rear closure cap carries a switch assembly which is movable into and out of engagement with the motor terminals for energization and deenergization of the motor, while the front closure cap makes provision for supporting the power train which extends from the motor to the two output members of the power train.

The provision of an electric motor, power train and casing assembly of the character set forth above being the principal object of the invention, a further object is to provide a motor and casing unit which, although the shape characteristics or dimensions of the motor may vary appreciably, the design of the casing is such then that when a number of the casings have been assembled, the respective parts of each casing will fit together perfectly, will present no appreciable or discernible difference in size or shape characteristics from its companion casings, will be devoid of open seams, and will effectively maintain the motor and its power train operatively assembled against dislodgment.

With these and other objects in view which will become more readily apparent as the invention is better understood, the invention consists in the novel construction, combination and arrangement of parts shown in the accompanying single sheet of drawings forming a part of this specification.

In these drawings:

FIG. 1 is a perspective view of a portable tool assembly constructed in accordance with the principles of the present invention;

FIG. 2 is an enlarged exploded perspective view of the portable tool assembly of FIG. 1;

FIG. 3 is a sectional view taken substantially centrally and longitudinally through the tool assembly;

FIG. 4 is a horizontal sectional view taken on the line 4—4 of FIG. 3;

FIG. 5 is a transverse sectional view taken on the line 5—5 of FIG. 3; and

FIG. 6 is a sectional view taken on the line 6—6 of FIG. 3.

Referring now to the drawings in detail, a portable tool assembly constructed according to the present invention has been shown in FIG. 1 and designated in its entirety by the reference numeral 10. The assembly is designed for use in connection with a wide variety of detachable reciprocable tools such, for example, as the nail file unit 12 shown in FIGS. 2, 3 and 4. The nature of such unit will be set forth presently. The assembly also may be used in connection with additional rotary tools, such as the rotary buffer unit 14 shown in FIGS. 2, 3 and 5.

The portable tool assembly 10 involves in its general organization an electric motor 16 (see FIGS. 2, 3 and 4) having a motor shaft 18. The latter carries a drive pinion 20 which constitutes the single input element of a dual output power train, the power train further including a plastic ring gear 22. Such ring gear is carried on a metal hub 24 which is provided with an integral extending output shaft 26, the upper end of which is provided with an external or male screw 28. The hub is also provided with a downwardly extending ecentric shaft 30 which receives thereover a bushing 32 of brass or other suitable material. The ring gear 22 meshes with and is driven by the drive pinion 20, and the eccentric shaft 30 and the bushing 32 project into a diagonally extending slot 34 in the central portion of an elongated tool-supporting slide member 36. The latter reciprocates axially or lengthwise in response to rotation of the eccentric shaft 30 about the axis of the hub 24. The forward or outer end of the slide member 36 is flattened as at 38 for frictional reception thereover of a suitable reciprocable tool such as the previously mentioned file unit 12. The vertically extending output shaft 26 is adapted threadedly to receive thereon a suitable rotary tool such as the previously mentioned buffer unit 14. A flywheel 40 is mounted on the motor shaft 18 and serves to assimilate the reaction forces which are occasioned by direction reverses in the movement of the slide member 36, thereby smoothing the operation of the electric motor 16.

The motor 16 is purely conventional in its design and no claim is made herein to any novelty associated with the same, the novelty of the present invention residing rather in the nature of the hereinafter described casing within which the motor and its power train are installed in a special manner in order to produce the portable tool assembly 10. Briefly, the motor 16 comprises a cylindrical motor housing 42 including opposed housing sections which support therebetween oppositely directed, radially extending opposed field magnets 44. The motor further comprises a rotary armature (not shown) and the usual commutator, brushes and the like (also not shown). A terminal plate 48 is mounted on the housing 42 and extends horizontally thereacross at the upper portion thereof. This terminal plate 48 presents two electrical terminals 50 (see FIGS. 2 and 6) which are designed for connection to a suitable source of energizing current.

The motor 16 is operatively and fixedly clamped in position within a three-part separable casing including a central or intermediate casing part 60, a front closure cap 62 and a rear closure cap 64, these three parts being preferably formed of a suitable thermoplastic or thermosetting plastic material. The central casing part 60 is of flattened ring-like design and it presents opposed upper and lower flat internal faces 64 and 66 between which the flat end faces of the field magnets 44 fit. Rearward shifting of the motor 16 within the casing is prevented by a pair of upper internal ribs 68 and a pair of lower internal ribs 70 on the rear closure cap 64 (see FIGS. 2, 3 and 4). Certain surfaces of the rearmost field magnet 44 abut against the front ends of these ribs when the tool assembly 10 is in its fully assembled condition. A rearwardly facing internal shoulder 72 on the central casing part 60 prevents forward shifting of the motor 16. The end portions of the terminal plate 48 overlie and rest upon the ribs 68, thus further stabilizing the motor 16.

The front and rear closure caps 62 and 64 are of deep cupshape design and the rims of these caps fit telescopically over the open rims of the central casing part 60. A band 74 of the casing part 60 projects radially outwardly between the opposed rims of the closure caps 62 and 64 and preserves the smooth continuity of the casing as a whole.

The central casing part 60 of the three-part casing is formed with an integral, forwardly extending extension 80 which presents or embodies a forwardly and downwardly extending curved surface 81. The latter fits substantially coextensively against a similarly curved inside wall surface 82 (see FIG. 3) within the front closure cap 62 when the casing parts are assembled. The underneath side of the extension 80 is relieved to accommodate the flywheel 40 and the drive pinion 20. A vertical bore 84 (see FIG. 2) is formed in the medial region of the extension 80 and receives therein a sleeve bushing 86 within which the vertically extending output shaft 26 is rotatably confined. The upper or outer end of the bore 84 registers with an access hole 88 in the upper portion of the closure cap 62. The shank portion of the buffer unit or other tool which is to be applied to the output shaft 26 is adapted to be projected through the access hole 88 at the time of installation, that is, connection to the upper threaded end of said shaft 26.

The longitudinally reciprocable tool-supporting slide member 36 is supported and guided in its sliding movement both at the front and at the rear end thereof. At its rear end, the slide member has an offset portion 90 which is supported and guided in a slot 94 in the underneath or bottom portion of the central casing part 60. At its forward end, the slide member 36 is guided in a slot 96 in the distal or front end of the forwardly extending extension 80. A hole 98 in the forward end of the front closure cap 62 provides a clearance opening for the forward end region of the tool-supporting slide member 36. The slide member projects outwardly of the front or outer end of the three-part casing of the tool assembly 10 through said hole 98 in order that the flattened end 38 thereof is readily accessible for frictional and telescopic reception thereover of the hollow shank portion 99 of the nail file unit 12 or the similar shank portion of such other tool as may be applied to the slide member 36.

Energization of the electric motor 16 is effected under the control of a longitudinally shiftable switch assembly 100 (see FIGS. 2 and 3) which is capable of movement into and out of engagement with the terminal plate 48. The switch assembly 100 comprises an elongated plastic thumb piece 102 which is formed with longitudinal guide slots 104 in its side portions. Such guide slots have a sliding fit with the side edges of an elongated slot 106 in the top wall 108 of the rear closure cap 64. A pair of contact strips 110, each having a reentrant portion 112, is carried by the side portions of the thumb piece 102 and the strips 110 are soldered to the terminal ends, of a pair of flexible lead-in wires 114 which enter the three-part casing of the tool assembly 10 through a hole 116 in the extreme rear end of the rear closure cap 64. The other ends of the lead-in wires are adapted to be connected to one or more flashlight batteries (not shown) in order that the motor 16 may be supplied with electric current. The switch assembly 100 is movable between an inoperative retracted position wherein the contract strips 110 are out of engagement with the two terminals 50 on the terminal plate 48, and an advanced position wherein the reentrant portions of the these contact strips make electrical contact with the terminals. The switch assembly 100, therefore, embodies no relatively moving switch parts, the assembly being merely shifted bodily into and out of operative engagement with the electrical terminals 50.

While the three casing parts 60, 62 and 64 have been illustrated and described herein as being formed of a suitable molded plastic material, if desired these parts may be formed of metal. When formed of a plastic material, the parts may be secured together in their assembled relationship with respect to the motor 16 by the application of a suitable adhesive or solvent to the rim regions of the parts. Clamping pressure need be maintained for but a brief interval of time while the adhesive or solvent hardens or solidifies. If the casing be formed of metal, soldering or spot-welding operations may be employed for securing the parts together.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is it to be limited.

Having thus described the invention, what I claim as new and desire to secure by Letters Patent is:

1. In a portable tool assembly, the combination with an electric motor having a generally cylindrical motor housing the axis of which extends horizontally and from which there projects forwardly and endwise a rotatable motor shaft, said motor housing being provided with a pair of radially extending, vertically disposed oppositely directed projections thereon, each embodying a motor field magnet, a horizontally reciprocable tool-supporting slide member, and a power train connecting said motor shaft and slide member for translating rotary motion of the shaft into reciprocating motion of the slide member, of a three-part casing for said motor and power train and including a central casing part of generally ring-like configuration, a front closure cap telescopically received over a limited front rim region of the central casing part, and a rear closure cap telescopically received over a limited rear rim region of the central casing part, said central casing part being provided with opposed upper and lower motor-supporting surfaces between which the motor housing is disposed in frictionally fitting relation, a shoulder formed internally of the rear closure cap and against which the rear face of one of said field magnets bears to prevent rearward shifting of the motor, a shoulder formed internally of the central casing part and against which the front face of one of said field magnets bears to prevent forward shifting of the motor, there being an opening in the forward end of the front closure cap through which the slide member extends, cooperating guide means on the central casing part and front closure cap constraining said slide members to move in its horizontal path of reciprocation, the forward end of said slide member exteriorly of the casing being provided with means facilitating removable attachment of a power tool, the rear end of said rear closure cap being formed with an opening therein, a flexible lead-in cord for supplying electric current to said motor projecting through said opening in the rear end of the rear closure cap.

2. A portable tool assembly as set forth in claim 1 and including, additionally, a second shoulder formed internally on said rear closure cap and against which the other field magnet bears.

3. A portable power tool assembly as set forth in claim 1 and including, additionally, a terminal strip on said motor housing presenting a pair of exposed contact terminals, a switch assembly slidably disposed on said rear closure cap and including a pair of flexible contact strips, said contact strips being operatively and electrically connected to said flexible lead-in cord, said switch assembly being movable bodily between a retracted inoperative position wherein said contact strips are out of engagement with said exposed contact terminals and an advanced operative position wherein said contact strips engage and make electrical connection with said exposed contact terminals, the wall of said rear closure cap being formed with a slot therein, and a thumb piece connected to said switch assembly and projecting slidably through said slot and having a portion thereof disposed exteriorly of the casing for manipulation thereof.

4. A portable power tool assembly as set forth in claim 3 and wherein said switch assembly is supported directly and solely by said thumb piece.

5. A portable power tool as set forth in claim 1 and wherein said cooperating guide means on the central casing part and front closure cap includes a slot in said central casing part into which the slide member projects, the bottom wall of the front closure cap underlying said slot and, in combination therewith, serving to confine the slide member in its sliding movements.

6. In a portable tool assembly, the combination with an electric motor having a generally cylindrical motor housing the axis of which extends horizontally and from which there projects forwardly and endwise a rotatable motor shaft, a horizontally reciprocable tool-supporting slide member, a pinion mounted on said motor shaft, a ring gear meshing with said pinion and rotatable about a vertical axis, an eccentric shaft on said ring gear, said slide member being formed with a transverse slot therein through which said eccentric shaft projects for translating rotary motion of the ring gear into longitudinal reciprocation of the slide member, of a three-part casing for said motor, pinion and ring gear and including a central casing part of generally ring-like design, a front closure cap telescopically received over a limited front rim region of the central casing part, and a rear closure cap telescopically received over a limited rear rim region of the central casing part, said central casing part being provided with opposed upper and lower motor-confining surfaces between which said motor housing is disposed, cooperating means on the central casing part and rear closure cap for preventing axial shifting of the motor housing within the casing, said central casing part being formed with a forward extension which projects into the front closure cap and overlies the bottom wall of the latter, said forward extension being formed with a vertical bore therein, a shaft carried by said ring gear and rotatably journalled in said vertical bore, there being an opening in the forward end of the front closure cap through which the slide member extends, cooperating means on the central casing part and front closure cap constraining said slide member to move in its horizontal path of reciprocation, the forward end of the slide member exteriorly of the casing being provided with means facilitating attachment thereto of a power tool, and a flexible lead-in connection for said electric motor extending through said rear casing cap.

7. A portable tool assembly as set forth in claim 6 and wherein the upper end of said shaft on the ring gear is threaded for reception thereover of the threaded shank of a rotary tool, the wall of said front casing part being formed with an access opening therein in register with the threaded end of the shaft.

8. In a portable tool assembly, the combination with an electric motor having a generally cylindrical motor housing the axis of which extends horizontally and from which there projects forwardly and endwise a rotatable motor shaft, a horizontally reciprocable tool-supporting slide member, a pinion mounted on said motor shaft, a ring gear meshing with said pinion and rotatable about a vertical axis, an eccentric shaft on said ring gear, said slide member being formed with a transverse slot therein through which said eccentric shaft projects for translating rotary motion of the ring gear into longitudinal reciprocation of the slide member, of a three-part casing for said motor, pinion and ring gear and including a central casing part of generally ring-like design, a front closure cap telescopically received over a limited front rim region of the central casing part, and a rear closure cap telescopically received over a limited rear rim region of the central casing part, said central casing part being provided with opposed upper and lower motor-confining surfaces between which said motor housing is disposed, cooperating means on the central casing part and rear closure cap for preventing axial shifting of the motor housing within the casing, said central casing part being formed with a forward extension which projects into the front closure cap and overlies the bottom wall of the latter, said forward extension being formed with a vertical bore therein, a shaft carried by said ring gear and rotatably journalled in said vertical bore, there being an opening in the forward end of the front closure cap through which the slide member extends, the rear end of said rearward extension being formed with a slot therein through which the forward end region of the slide member projects and within which it is guided, the forward end of the slide member exteriorly of the case being provided with means facilitating attachment thereto of a power tool, and a flexible lead-in connection for said electric motor extending through said rear casing cap.

9. In a portable tool assembly, the combination with an electric motor having a generally cylindrical motor housing the axis of which extends horizontally and from which there projects forwardly and endwise a rotatable motor shaft, a horizontally reciprocable tool-supporting slide member, a pinion mounted on said motor shaft, a ring gear meshing with said pinion and rotatable about a vertical axis, an eccentric shaft on said ring gear, said slide member being formed with a transverse slot therein through which said eccentric shaft projects for translating rotary motion of the ring gear into longitudinal reciprocation of the slide member, of a three-part casing for said motor, pinion and ring gear and including a central casing part of generally ring-like design, a front closure cap telescopically received over a limited front rim region of the central casing part, and a rear closure cap telescopically received over a limited rear rim region of the central casing part, said central casing part being provided with opposed upper and lower motor-confining surfaces between which said motor housing is disposed, cooperating means on the central casing part and rear closure cap for preventing axial shifting of the motor housing within the casing, said central casing part being formed with a forward extension which projects into the front closure cap and overlies the bottom wall of the latter, said forward extension being formed with a vertical bore therein, a shaft carried by the ring gear and rotatably journalled in said vertical bore, there being an opening in the forward end of the front closure cap through which the slide member extends, means on the forward end of the slide member exteriorly of the casing facilitating attachment thereto of a power tool, the rear end of said rearward extension being formed with a slot therein through which the forward end region of the slide member projects and within which it is guided, said central casing part being formed with a slot therein into which the rear end of the slide member projects and within which it is guided, and a flexible lead-in connection for said electric motor extending through said rear casing cap.

No references cited.

ORIS L. RADER, *Primary Examiner.*